Jan. 13, 1948.                H. M. STEARNS                     2,434,293
        FREQUENCY CONTROL OF AN OSCILLATOR OF THE VELOCITY MODULATION TYPE
                    Filed May 11, 1943            4 Sheets-Sheet 1
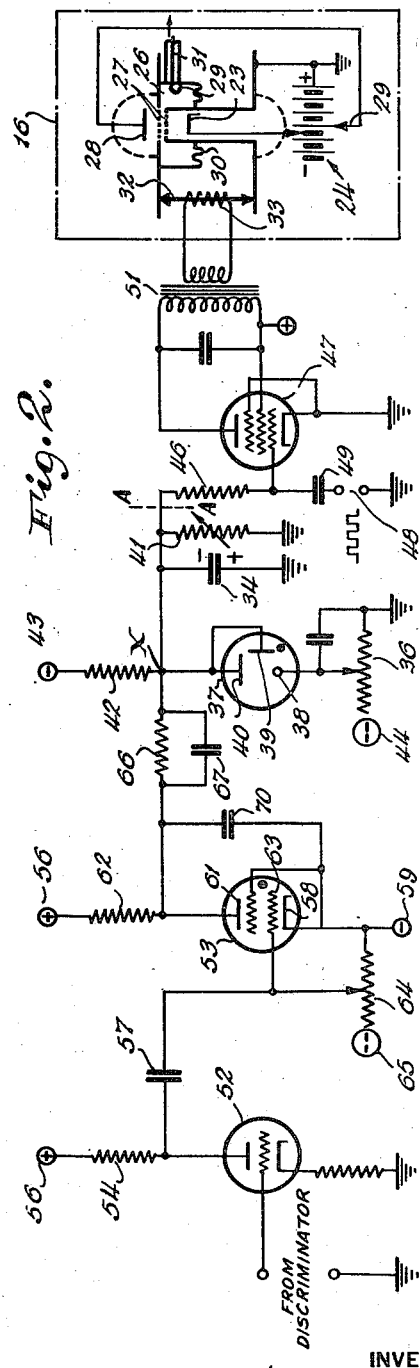
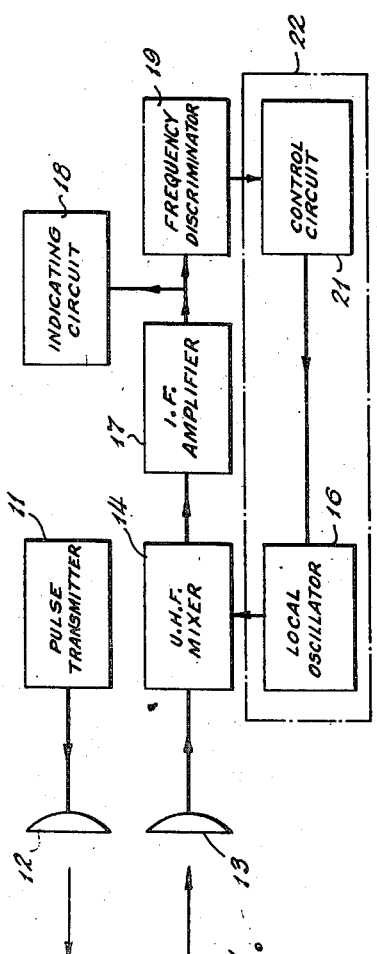
INVENTOR
HORACE MYRL STEARNS
BY
ATTORNEY Jan. 13, 1948.  H. M. STEARNS  2,434,293
FREQUENCY CONTROL OF AN OSCILLATOR OF THE VELOCITY MODULATION TYPE
Filed May 11, 1943  4 Sheets-Sheet 2

INVENTOR
HORACE MYRL STEARNS
BY Paul B. Hunter
ATTORNEY

Jan. 13, 1948.    H. M. STEARNS    2,434,293
FREQUENCY CONTROL OF AN OSCILLATOR OF THE VELOCITY MODULATION TYPE
Filed May 11, 1943    4 Sheets-Sheet 3

INVENTOR
HORACE MYRL STEARNS
BY
Paul B. Hunter
ATTORNEY

Jan. 13, 1948.   H. M. STEARNS   2,434,293
FREQUENCY CONTROL OF AN OSCILLATOR OF THE VELOCITY MODULATION TYPE
Filed May 11, 1943   4 Sheets-Sheet 4

INVENTOR
HORACE MYRL STEARNS
BY
ATTORNEY

Patented Jan. 13, 1948

2,434,293

UNITED STATES PATENT OFFICE 2,434,293

FREQUENCY CONTROL OF AN OSCILLATOR OF THE VELOCITY MODULATION TYPE

Horace Myrl Stearns, Merrick, N. Y., assignor to Sperry Gyroscope Company, Inc., a corporation of New York Application May 11, 1943, Serial No. 486,589

25 Claims. (Cl. 250—36)

The present invention is related to the art concerning automatic frequency control systems, and especially, but not restricted to, those adapted to maintain proper frequency output of velocity-modulation type oscillators.

The present system is especially adapted for the control of a velocity modulation oscillator of the so-called "reflex" type, such as disclosed in Fig. 2 of Varian and Hansen Patent No. 2,250,511, issued July 29, 1941, but is not limited thereto. In such an oscillator, an electron beam is passed through a hollow cavity resonator and is thereafter reflected by a suitable reflector electrode and re-enters the resonator. The first passage of the beam through the resonator produces periodic variation of the electrons of the beam. These electrons, during the ensuing period in which they travel toward the reflector and are reflected therefrom, become grouped or bunched and impart ultra-high-frequency energy to the resonator upon their reentry therein, whereby ultra-high-frequency oscillations are set up and maintained in the cavity resonator. The frequency of the output oscillations of such a device may be adjusted within narrow limits by adjusting the electron transit time by adjusting the potential applied to the reflector electrode. This frequency may also be varied over wider limits by adjusting the resonant frequency of the cavity resonator, as by varying the physical dimensions or grid spacing thereof. One method of thus tuning a reflex velocity modulation oscillator is shown in copending application Serial No. 462,436, filed October 17, 1942, in the names of D. L. Snow et al. As is shown in this copending application, the tuning of the resonator of the cavity is controlled by a thermally expansible element whose expansion is controlled by current passing therethrough, which heats the expansible element and thereby causes extension thereof. The present invention is particularly adapted to control oscillators of the type shown in this copending application, but it is to be understood that the present invention is not necessarily restricted to such oscillators.

In electronic apparatus, generally, the device does not attain its stable operating condition immediately, but requires a warm-up period during which the various parts attain their operating temperature and warmed-up condition. During this warm-up period, the output frequency of oscillators, in particular, drifts widely. One method of compensating for this drift is to so select the initial energizing conditions for the oscillator that, after a suitable period, the oscillator will have drifted to the proper operating frequency. This, however, is open to the objection that a considerable time may be necessary for warm-up. Other attempts to overcome this problem have involved the use of special thermal compensation to reduce the frequency drift due to warm-up. Such devices, however, have been extremely complex and have only approximately attained the desired result.

According to the present invention, an oscillator is operated so as to automatically seek out and maintain its output frequency in fixed predetermined relationship to a standard frequency, which, in the illustration to be described, may be a received wave with which it is desired to maintain the oscillator output in fixed relation, such as with a fixed frequency difference therebetween. For this purpose, the output frequency of the oscillator is caused to sweep or scan back and forth between its extreme operating limits at a fairly rapid rate, much more rapid than the usual rate at which the frequency drifts. When the frequency approaches that which it is desired to maintain, as determined by a suitable relationship to the standard or reference frequency, the sweeping or scanning action is automatically interrupted and the output of the oscillator is thereafter maintained automatically in the desired frequency relationship to that of the standard frequency.

Accordingly, it is an object of the present invention to maintain the output frequency of an oscillation generator in fixed predetermined relation to any suitable source of reference frequency.

It is another object of the present invention to maintain a predetermined frequency relationship between an arbitrary reference frequency and the output of a reflex velocity modulation oscillator.

It is yet another object of the present invention to control the output frequency of an oscillator to automatically hunt for its desired output frequency, and to automatically maintain that desired output frequency when it has been once attained.

A further object of the present invention is to provide improved apparatus for sweeping the output frequency of an ultra-high frequency oscillator across a desired frequency band, and for adjusting this band.

Still another object of the present invention is to provide improved apparatus for controlling a reflex velocity modulation oscillator, by adjusting the output frequency thereof.

It is yet a further object of the present invention to provide improved control of reflex velocity modulation electron discharge devices by simultaneous control of the reflector electrode and tuned circuit thereof.

It is still another object of the present invention to provide improved control of a thermally tuned oscillator, to sweep its output frequency across a desired and adjustable band, and to maintain its output frequency at a desired value.

Other objects and advantages of the present invention will become apparent from consideration of the following drawings and specification, wherein, Fig. 1 shows a schematic block diagram of one type of system to which the present invention has particular application;

Fig. 2 shows a wiring diagram of the present invention, including those parts of Fig. 1 within the dot-dash line 22 thereof;

Figure 3:
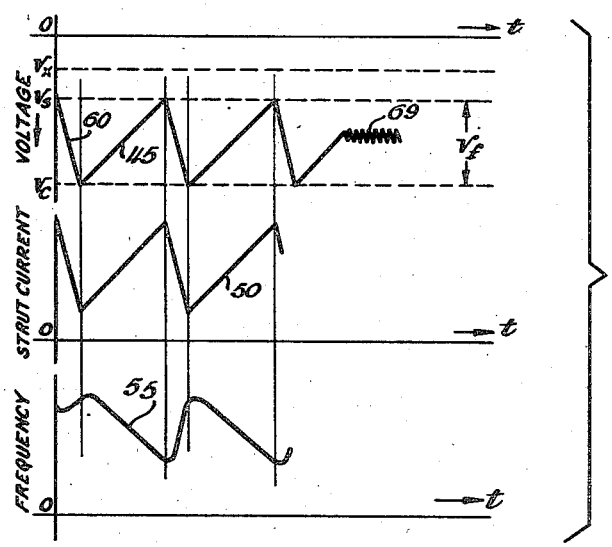
Fig. 3 shows voltage-time graphs useful in explaining the operation of the device of Fig. 2.

Considering Fig. 1, there is shown, for illustrative purposes, a system in which the present invention may be utilized. It is to be understood, however, that the present invention may also be utilized in many other and widely different systems, the present system being shown for illustrative purposes only. The system of Fig. 1 is a radio object detecting and locating system in which a pulse transmitter 11 produces a sequence of periodically repeated pulses of ultra-high-frequency energy which are radiated directionally by a suitable directional antenna 12 toward the distant object to be located. When such an object is irradiated by this ultra-high-frequency energy, a portion of the energy incident on the object will be reflected thereby, and may be received by a corresponding directional radiant energy receiving antenna arrangement 13. This received energy is thereupon fed to an ultra-high-frequency mixer 14, of any suitable well-known type.

Also supplied to mixer 14 is an ultra-high-frequency wave produced by a local oscillator 16. Mixer 14 is thereby adapted to produce in its output an intermediate or beat frequency having a value which is the difference between the frequencies of the wave produced by local oscillator 16 and that received from the distant object. This intermediate frequency is then amplified in a suitable conventional intermediate frequency amplifier 17, whose output is connected to an indicating circuit 18 of any desired type for indicating the distance and/or orientation of the distant object. The details of the transmitter 11, mixer 14, amplifier 17 and indicating circuit 18 form no part of the present invention and need not be recited in detail here.

Figure 4:
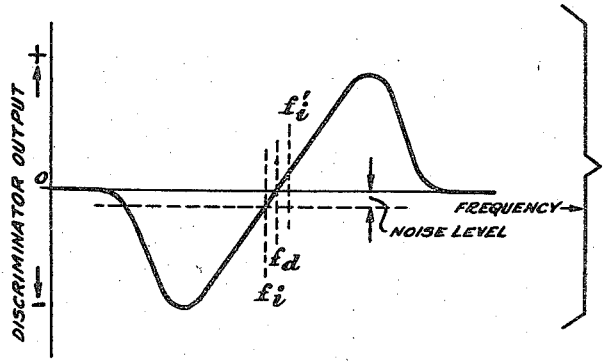
Fig. 4 shows the voltage-frequency characteristic of a conventional frequency discriminator, as used in Fig. 2.

It is desirable to maintain a constant intermediate frequency for this system. This may be done, as in the present case, by suitably controlling the local oscillator 16 to maintain it in fixed frequency relation with respect to the wave received by antenna 13; for example, having a fixed frequency difference with respect to the frequency of the received wave. For this purpose, the output of intermediate frequency amplifier 17 is fed to a frequency discriminator circuit 19 of any conventional type which is adapted, as is well known, to produce output potentials corresponding to the deviation of the intermediate frequency supplied to it from a predetermined frequency to which the discriminator is tuned, these discriminator output potentials having a predetermined polarity for one sense of such frequency deviation and having opposite polarity for opposite sense of frequency deviation. Fig. 4 shows the usual output voltage versus input frequency characteristic for such a discriminator, the discriminator tuned frequency being $f_d$.

In the present instance, these potentials derived from discriminator 19 operate to revise the output frequency of oscillator 16 to maintain the intermediate frequency derived from mixer 14 at substantially the value $f_d$ for which the discriminator is tuned. This control of oscillator 16 is produced by a control circuit 21 responsive to the output of discriminator 19.

It will be noted that, since the wave transmitted by transmitter 11 and reflected by the distant object is a periodic pulse wave, the output of mixer 14 will be a sequence of pulses of the intermediate frequency, and likewise the output of discriminator 19 will be a sequence of uni-directional voltage pulses, but having a polarity and magnitude corresponding to the sense and magnitude of the frequency deviation of the intermediate frequency from the desired value as determined by the tuned frequency $f_d$ of the discriminator 19. The present invention is directed more particularly to the details of the control circuit 21 in its relation to the local oscillator 16, as will be seen in Fig. 2, which shows the circuit diagram of the portion of the system of Fig. 1 contained within dot-dash line 22, that is, the control circuit 21 and the local oscillator 16.

As is seen in Fig. 2, the local oscillator 16 therein diagrammatically illustrated is of the thermally tuned reflex velocity modulation type, and comprises a cathode 23 maintained at a high negative potential with respect to the casing of a resonator 26 by means of a battery 24, so that a beam of electrons is projected from cathode 23 through the grids 27 of resonator 26. A reflector electrode 28 is located in the path of the electron beam leaving the resonator 26, and has applied thereto a potential negative with respect to the resonator 26, which potential may be slightly positive or slightly negative with respect to cathode 23, as adjusted by means of a tap 29 on battery 24. Reflector 28 is thereby adapted to reverse the electrons of the stream and to reproject them into the resonator 26 to set up and sustain oscillations therein, in accordance with the well-known theory of such reflex oscillators, described more in detail with respect to Fig. 2 of Patent No. 2,250,511. These oscillations may then be supplied by way of a coupling loop 29 and a coupling transmission line 31 to the mixer 14 or to any other type of load or utilization device.

In the system shown in Fig. 2, the resonator 26 is formed of two separate rigid portions connected by flexible diaphragm 30 to permit adjustment of the size of resonator 26 and the relative spacing of grids 27, whereby the output frequency of the oscillator 16 may be adjusted. To adjust this output frequency, a thermally expansible tuning strut, indicated diagrammatically at 32, is interposed between the two portions of the resonator 26. Surrounding the tuning strut 32 is a suitable heating coil or resistor 33. In this way, by passing a predetermined amount of current through heater 33 the tuning strut 32 will be expanded or contracted by a corresponding predetermined amount, and will adjust the output frequency of the oscillator 16 correspondingly. Atmospheric pressure on the evacuated resonator takes up back-lash, or a tension spring coupling the two parts of resonator 26 may be used. As shown here, an increase in strut current will separate grids 27, to increase the output frequency, but the tube may be arranged, if desired, to decrease its frequency with increase of strut current.

The remainder of the circuit of Fig. 2 represents the control circuit 21 for adjusting the current supplied to the heater coil 33, to make the output frequency of oscillator 16 properly related to the frequency received by mixer 14; that is, to hunt for and to maintain the proper intermediate frequency.

In order that oscillator 16 may hunt out its required operating frequency, its output frequency is periodically swept or scanned over its complete tuning range. In the present case, this is done by periodically charging and discharging a large condenser 34. Condenser 34 is connected in series with an adjustable source of negative potential, represented by a voltage divider 36, through a gas discharge or trigger tube 37 which may be of the cold cathode type, commercially known as the OA4-G. Such tubes have a cold cathode 38, a discharge-initiating or starting electrode 39 and an anode 40. As is well known, when a predetermined firing voltage is impressed between the starting electrode 39 and the cathode 38, an electric discharge is initiated between anode 40 and cathode 38, which will be maintained so long as anode 40 remains positive with respect to cathode 38. Under these conditions, tube 37 is effectively a short-circuit.

In the present circuit, the starting electrode 39 and the anode 40 are connected together so that the same potential with respect to cathode 38 is applied to each. The potential of anode 40 is determined by its connection to point X of a voltage divider formed by resistors 62, 66 and 42 connected between a negative potential source 43 and a positive potential source 56. Point X generally will have a negative potential with respect to ground. Voltage divider 36 has one end grounded as shown and the other end connected to a further source of negative potential 44, which supplies a larger negative voltage than does source 43.

Let it be assumed that initially the voltage $V_c$ (Fig. 3) of cathode 38, as determined by voltage divider 36, is adjusted to be more negative than the potential $V_x$ of point X by an amount exceeding the firing voltage $V_f$ of the trigger tube 37. Accordingly, upon energization of the circuit, tube 37 will immediately discharge, and will become essentially a short-circuit, whereby condenser 34 is rapidly charged up to substantially voltage $V_c$ as shown at 60. Since anode 40 is connected to the high negative potential side of condenser 34, it will be seen that its potential is thereby reduced to a value substantially equal to that of cathode 38. For this reason, the discharge between cathode 38 and anode 40 is interrupted, and an essentially open circuit is interposed between condenser 34 and voltage divider 36. Condenser 34 now proceeds to discharge, through a resistor 41 connected in parallel thereto, at a rate which may be controlled by suitably adjusting or selecting the resistance of this resistor 41, which may be made variable as shown. As the charge of condenser 34 leaks off through resistor 41, its voltage gradually decreases, as shown by curve 45 of Fig. 3. The potential of anode 40 and starting electrode 39, to which condenser 34 is connected, also follow curve 45.

When the negative potential of starting electrode 39 with respect to ground reaches the value $V_s$ differing from that of cathode 38 by an amount equalling or just exceeding the firing potential $V_f$, trigger tube 37 will again discharge, thereby recharging condenser 34 and initiating a further similar cycle of operations. In this manner, neglecting for the present the effect of the remainder of the circuit, the voltage across condenser 34 is cyclically varied in sawtooth fashion as is shown at 60, 45 in Fig. 3.

This voltage across condenser 34 is connected through a coupling or grid-current limiting resistor 46 to the control grid of a power tube 47 operating as a class C amplifier, so that this voltage serves to control the conductivity of tube 47. Superposed on the control grid of tube 47 through a blocking condenser 49 is a suitable alternating voltage supplied through terminals 48 and coupling condenser 49. This alternating voltage has a relatively low frequency, but of a value sufficiently high so that the thermal inertia of heater coil 33 will prevent the expansion and contraction of tuning strut 32 from following the alterations of voltage supplied to terminals 48. As an illustrative example, this low frequency voltage may have a frequency of 1–50 kilocycles. Preferably, this voltage has a square wave form, so that the power delivered to strut 32 will vary linearly with the voltage of condenser 34. Tube 47 acts as a power amplifier and amplifies the low frequency voltage connected to terminals 48. The output of tube 47 is supplied through an output transformer 51 directly to the heater coil 33.

It will be seen therefore that the low frequency voltage connected to terminals 48 serves to energize the heater coil 33 and thereby heats the tuning strut 32 and controls the output frequency of oscillator 16 in accordance with the amplitude of the output of power tube 47. This output is controlled by the voltage derived from condenser 34. As discussed above, this voltage is of sawtooth form as shown at 60, 45 in Fig. 3 so that the energizing current of tuning strut 32 will have a corresponding sawtooth form, as shown at 50, and will thereby sweep or scan the output frequency of oscillator 16 between two limits which may be selected to be substantially the tuning limits of the oscillator. As shown at 55 in Fig. 3, the frequency sweep will lag slightly behind the condenser sawtooth voltage 45 because of the tuning strut thermal inertia.

The frequency of the sawtooth oscillations may be adjusted by adjusting the resistance of resistor 41 to adjust the discharge rate of condenser 34. The scanning limits may be adjusted by adjusting the potential $V_c$ of cathode 38 of the trigger tube 37 by means of variable voltage divider 36. It will be noted that the connection of anode 40 to point X prevents the frequency of oscillator 16 from going lower than the value corresponding to $V_x$. Thus, if $V_c$ is decreased so as to differ from $V_x$ by less than $V_s$, tube 37 will no longer trigger, and no sawtooth oscillations can occur. Hence, the other scanning limit may be adjusted by adjusting the potential of point X. The voltage divider 42, 66, 62 may be made adjustable for this purpose.

In this way, oscillator 16 may be caused to periodically scan its output frequency between desired limits and at a desired rate. Preferably, the frequency of sawtooth oscillations is adjusted to a fairly low value, such as of the order of ⅕ to 16 cycles per second, which rate of frequency variation is low enough to permit the output frequency of oscillator 16 to follow the sawtooth scanning, as shown at 55.

Thus far, the manner in which the frequency discriminator 19 controls the oscillator 16 has not been described. Briefly, discriminator 19 acts to prevent the discharge of condenser 34 to a value at which the trigger tube 37 will discharge, so long as the output frequency of oscillator 13 has the value which gives a proper intermediate frequency value. Thus, the output of discriminator 19 is supplied to an amplifier tube 52 of any conventional type having a conventional output resistor 54 connected to a positive potential source 56. The output of tube 52 in turn is coupled to a gas switching control tube 53, such as of the conventional type 2050, by way of a coupling condenser 57. The cathode 58 of control tube 53 is connected to a source of negative potential 59, which may be of the same or a lower voltage with respect to source 43. Anode 61 of tube 53 is connected to positive potential source 56 through a resistor 62 which thereby also serves as its output resistor. A suitable bias for the control grid 63 of tube 53 may be provided, as by a suitable variable voltage divider 64 connected to a source of higher negative potential 65. Control tube 53 has its bias adjusted so as to be biased slightly beyond cut-off. In this way, it does not respond in any manner to negative pulses applied to grid 63 but will respond to positive pulses exceeding the bias. The bias is so adjusted that tube 53 will not respond to noise pulses, but only to signal pulses of higher amplitude than the noise pulses. If desired, grid 63 may be biased just at cut-off, so that tube 53 will respond to all positive input pulses.

The operation of the device may be explained with reference to Fig. 4, which shows the relationship between the intermediate frequency and the output of discriminator 19 for a fixed input voltage to discriminator 19. This is the well-known frequency discriminator characteristic.

It will be seen that as the output frequency $f_o$ of oscillator 16 is swept through its tuning band, this frequency will approach, attain, and pass a certain desired value, at which the mixer output frequency equals the discriminator frequency $f_d$. As the oscillator frequency $f_o$ approaches this desired value from a higher value, discriminator 19 will produce an output having a predetermined polarity which, as shown in Fig. 4, is positive. As the mixer output or intermediate frequency passes $f_d$, the polarity of the output of frequency discriminator 19 will reverse, and the discriminator will now yield a negative output. This output of discriminator 19 in each case will be in the nature of periodic unidirectional pulses corresponding to the pulses transmitted by transmitter 11. This pulse repetition rate is sufficiently high with respect to the rate at which the frequency of oscillator 16, and hence the intermediate or mixer output frequency, is being swept through the tuning band so that a plurality of these pulses will pass through the discriminator 19 during the time that the intermediate frequency is swept past the tuned frequency $f_d$ of discriminator 19. Now, as the intermediate frequency approaches the discriminator frequency $f_d$, the positive pulses thereby produced are amplified by amplifier 52, which reverses them in polarity so that corresponding amplified but negative pulses are applied to grid 63 of tube 53. Since the tube 53 is biased beyond cut-off, these negative pulses have no effect.

When the intermediate frequency has passed the discriminator frequency $f_d$, the pulses produced by the discriminator 19 reverse in polarity and now become negative. These negative pulses applied to amplifier 52 are amplified and reversed in polarity, so that amplified positive pulses are impressed on the control grid of tube 53. When these positive pulses exceed the bias on grid 63 (corresponding to an intermediate frequency $f_1$), they cause the gas tube 53 to become conductive, drawing current through its output resistor 62, and thereby decreasing the potential of anode 61. Anode 61 is connected to anode 40 of trigger tube 37 through a resistor 66. In this manner, the decrease in potential of anode 61 with respect to ground is transmitted as a corresponding decrease in the potential (or increase in negative potential) of anode 40, which is connected to the negatively charged plate of condenser 34. The negative charge on condenser 34 is therefore increased by a slight amount during the time tube 53 is conducting. This is shown more clearly in Fig. 5, which shows time-magnified curves similar to those of Fig. 3. This slight increase in charge of condenser 34, shown at 68 in Fig. 5, serves to stop the discharge of condenser 34 through resistor 41, and thereby serves to momentarily decrease the tuning strut heater current in the same manner, as shown at 155, and also decreases the rate at which the oscillator frequency and intermediate frequency vary.

A fairly large condenser 70 is connected across tube 53 and acts to block tube 53 a short time after the positive pulse on grid 63 ceases. As soon as tube 53 is blocked, the recharging of condenser 34 is cut off and condenser 34 resumes its discharging through resistor 41, as shown at 71 in Fig. 5.

Figure 5:
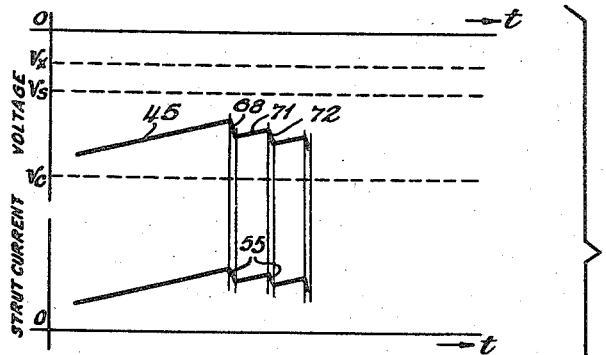
Fig. 5 shows magnified versions of portions of the voltage-time graphs of Fig. 3.

If the recharging of condenser 34 did not reduce the tuning strut current sufficiently to increase the intermediate frequency above $f_1$, the next discriminator pulse, which is then still positive of the proper polarity, will again trigger the tube 53 very shortly thereafter, to further recharge condenser 34, as shown at 72 in Fig. 5, and the same cycle repeats itself until the intermediate frequency climbs back above $f_1$. When this happens, the discriminator output pulses are no longer effective to trigger the tube 53. Then condenser 34 is permitted to discharge until the intermediate frequency again falls below $f_1$, when the discriminator pulses once more recharge the condenser 34 and pull the oscillator and intermediate frequency back to the desired value. In this way the device operates to keep the oscillator frequency floating about the value giving the intermediate frequency $f_1$.

Because of the inertia of the tuning strut, the actual output frequency of the oscillator 16 will not follow the rapid fluctuations of the voltage of condenser 34 or the strut current, but will remain substantially constant or will only vary slowly.

By making the amplification of amplifier 52 and tube 53 relatively large, the frequency characteristic of discriminator 19 shown in Fig. 4 can be made quite steep, so that the intermediate frequency $f_1$ at which the system is maintained will differ from the discriminator frequency $f_d$ by a very small amount, having a negligible effect on the operation of the circuit.

By the proper choice of circuit constants, the recharging of condenser 34 in response to a single discriminator pulse can be made sufficiently large so that it will take the condenser 34 a period of several discriminator pulses to drift back across the value producing intermediate frequency $f_1$. In this way tube 53 need operate in response to only one out of four or five discriminator pulses. The voltage of condenser 34 then correspondingly oscillates between two close limits as shown at 69 in Fig. 3, at a frequency one-fourth or one-fifth of the pulse repetition rate. The thermal inertia of the tuning strut prevents a similar oscillation in the oscillator frequency. If, for any reason, the discriminator outlet pulses fail for a short time, as for example due to failure of the transmitter, the thermal inertia of the strut will maintain almost constant frequency until the pulses resume control.

The switching operation of tube 53 already described occurs very rapidly and tends to produce a momentary but relatively high recharging voltage impulse for condenser 34. In order to lengthen the effect of this recharging voltage and to eliminate its very high amplitude which would necessitate high voltage condensers and insulators, a condenser 67 is shunted across resistor 66 and serves to by-pass the higher frequency components of the transient pulse so that they have relatively little effect on the recharging voltage.

The above description was based on the tacit assumption that the desired operating frequency of oscillator 16 required a predetermined fixed strut current corresponding to a predetermined setting of the tuning of resonator 26 of oscillator 16. However, it may happen that oscillator 16 has an inherent tendency to drift, in which case resonator 26 must be continuously reset to maintain constant output frequency. This, of course, requires a change in the average strut current. The present circuit is inherently adapted to operate properly under these conditions also.

Thus, if the oscillator frequency drifts so as to increase the intermediate frequency above the value $f_1$ the discriminator pulses will have no effect on tube 53 and condenser 34 then discharges through resistor 41 until the intermediate frequency once more passes below $f_1$. The average value of condenser voltage is then maintained at the new value required to again produce intermediate frequency $f_1$. This average condenser voltage will be lower than that existing before the drift occurred, as is required by the nature of the control desired.

On the other hand, should the oscillator frequency drift to decrease the intermediate frequency $f_1$, more of the discriminator pulses will trigger tube 53, producing a greater recharging effect for condenser 34, and thereby increasing its average voltage and decreasing the average strut current again to maintain the oscillator output at the proper value. In this way, oscillator 16 is caused to "lock-in" with the received wave and to maintain its output frequency at the exact proper value. It responds only to frequency change, and is no no way affected by the regularity or lack of regularity of the pulses.

In the above description tube 53 was described as a gas tube which was triggered by the discriminator output pulses. However, the system will operate in substantially the same manner if tube 53 is an ordinary vacuum amplifier tube, again biased beyond cut-off so that random noise pulses will produce no output therefrom. Then, when the intermediate frequency drifts below the value $f_1$, the negative discriminator pulses thereby produced will be amplified and reversed by tubes 52 and 53, and will serve to recharge condenser 34 to return the oscillator frequency to the proper value as already described. If the recharging effect of a single pulse is insufficient to prevent the oscillator from continuing its drifting, the next succeeding pulse will have a larger amplitude, due to the fact that the intermediate frequency has deviated by a larger amount from the discriminator frequency $f_d$, and will produce greater recharging. Again by making the amplification of discriminator pulses relatively large, the amplitude of the first or surely the second discriminator pulse occurring after crossing frequency $f_1$ may be made sufficiently large to recharge condenser 34 to maintain the oscillator frequency at the desired value. The system will then operate in exactly the same manner to prevent any change in the intermediate frequency, such as due to a change in the frequency radiated by transmitter 11 or due to inherent drift of oscillator 16.

It will be noted that the discharge tube 37 operates only during the searching or sweeping action, when the oscillator 16 is attempting to find or "hunt out" its correct operating frequency. Once the operating frequency is determined, in the automatic manner just described, trigger tube 37 no longer operates. However, should the oscillator frequency drift beyond the control range of discriminator 19, as, for example, due to a prolonged interruption of the transmitter 11 or for any other reason, it will be seen that, when the intermediate frequency has shifted beyond the operating range of discriminator 19, the charging control pulses are no longer produced by discriminator 19. Accordingly, condenser 34 will resume its discharging through resistor 41, permitting trigger tube 37 to fire as already described, so that the oscillator 16 will once more be swept through its tuning range until its frequency approaches the proper operating frequency, when the system will once more lock in. Accordingly, the system will automatically regain the desired operating frequency even after it has been lost for any reason.

Figure 6:
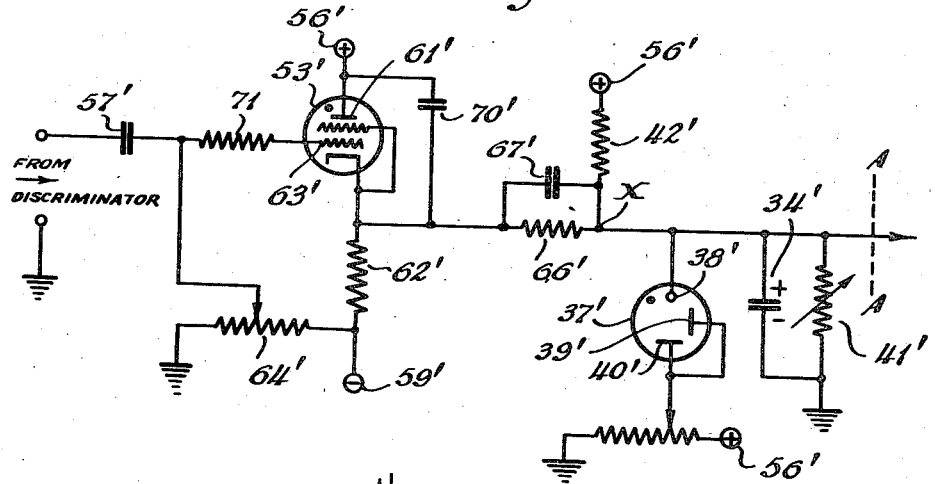
Fig. 6 shows a circuit diagram of a modification of the device of Fig. 2, being alternatively usable in place of the portion of Fig. 2 to the left of line A—A.

Fig. 6 shows a modification of the invention which may be used in place of the portion of the circuit of Fig. 2 to the left of line A—A thereof. In this case, the direction of band sweeping of the oscillator frequency is reversed from that shown in the modification of Fig. 2. Thus, in Fig. 6 the condenser 34', corresponding to the charging condenser 34 of Fig. 2, is now connected between ground and the cathode 38' of the gas discharge tube 37'. The anode 40' and firing electrode 39' are connected to the adjustable tap of variable voltage divider 36', which is energized from a source of positive potential 56'. The cold cathode 38' of tube 37' is connected to the point X of the voltage divider comprising resistors 42', 66' and 62', which are connected in series between a source 56' of positive potential and a source 59' of negative potential.

In this manner, when the potential applied to anode 40' and starting electrode 39' is made more positive than the potential of cathode 38' and point X by an amount exceeding the firing voltage of the tube, tube 37' will discharge, permitting condenser 34' to be positively charged substantially to the potential of anode 40'. Immediately after discharge, tube 37' blocks itself and condenser 34' begins to discharge through resistor 41'. When condenser 34' has discharged to a value such that the difference in potential between anode 40' and cathode 38' is again equal to the firing voltage, tube 37' triggers once more and the cycle of operations is repeated. The connection of cathode 38' to point X assures that the voltage of condenser 34' will never drop below the potential of point X as determined by the voltage divider 42', 66' and 62' across sources 56' and 59'.

Figure 7:
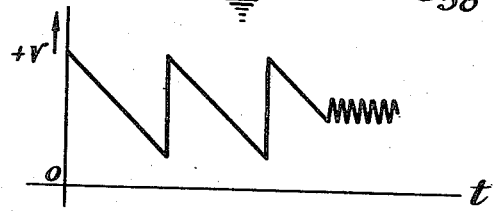
Fig. 7 shows a voltage-time graph similar to that of Fig. 3, useful in explaining the operation of the device of Fig. 7.

It will be seen that the system is substantially identical with that of Fig. 2 with the exception that condenser 34' produces a positive sawtooth control voltage. This voltage across condenser 34' is then led to the power amplifier 47 as in Fig. 2. However, it will be noted that this power amplifier is in this instance additionally provided with a source of bias (not shown) sufficient to permit proper operation as a class C amplifier. In this way, the sawtooth voltage of condenser 34' causes the output frequency of oscillator 16 to sweep across its frequency band periodically as before, but in a reverse sense. This voltage across condenser 34' is illustrated in Fig. 7, and is substantially identical with that of Fig. 3 with reverse sense of sweep.

To halt the band sweeping operation, and to initiate the automatic frequency control, the discriminator output is fed directly to tube 53' through a coupling condenser 57' and a series grid resistor 71. Tube 53' is now operated as a cathode follower tube, having a positive potential applied directly to its anode 61' from source 56', and having its load or output resistor 62' connected between its cathode and a source 59' of negative potential. Since the cathode of tube 53' is maintained more positive than source 59', by virtue of the action of voltage divider 42', 66' and 62', the negative bias on grid 63' may be obtained and adjusted by means of a variable voltage divider 64 connected between source 59' and ground. This bias is then set so that tube 53' will respond only to positive pulses derived from the discriminator output having an amplitude exceeding the grid bias, which is preferably adjusted to cut off undesired noise voltages. Resistor 71 serves as a grid current-limiting resistor, should the pulses from the discriminator drive grid 63' positive.

In this manner, when a sufficiently positive pulse is received from the discriminator, tube 53' becomes conductive and increases the potential of its cathode because of the added flow of current through the resistor 62'. This causes an increase in positive potential of point X, and serves to recharge condenser 34' during the duration of the conduction of tube 53'. Condenser 70' serves to block tube 53' shortly after the input positive pulse ceases. Therefore the action of the apparatus is exactly the same as in Fig. 2, and the voltage of condenser 34' will vary slightly about the value at which the proper oscillator output frequency and desired intermediate frequency are obtained.

It will be seen that, in the circuit of Fig. 6, the system will operate at the frequency $f_1'$ shown in Fig. 4, which is greater than the discriminator frequency $f_d$ by approximately the same amount as frequency $f_1$ is less than $f_d$. Tube 53' may be a vacuum tube, as discussed above relative to tube 53. Therefore, by choosing either the circuit of Fig. 2 or that of Fig 6, either direction of band sweeping may be produced as desired.

Figure 8:
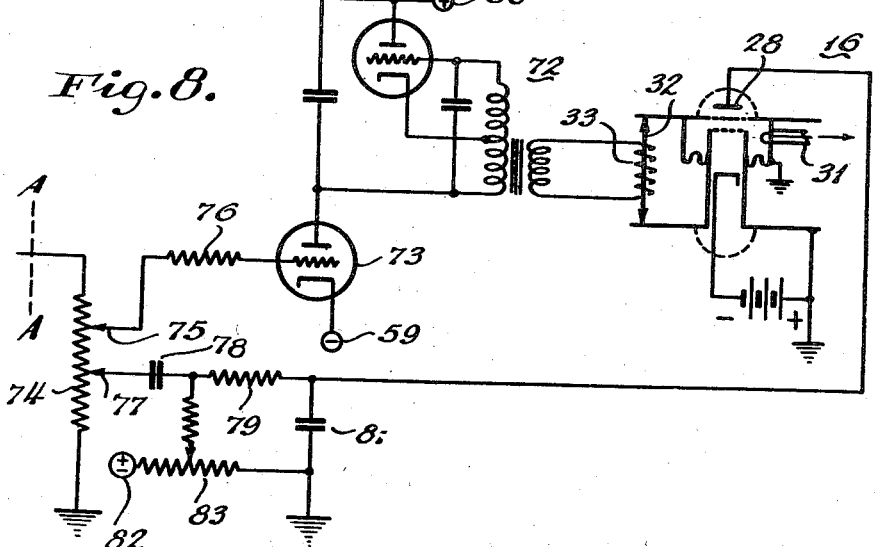
Fig. 8 shows a circuit diagram of a modification of a portion of the devices of Figs. 2 or 6, being alternatively usable in place of the portion of those figures to the right of line A—A.

Fig. 8 shows a modification of the portion of Fig. 2 to the right of line A—A, which may also be used with Fig. 6, if desired. In this instance, instead of controlling the class C amplifier or power amplifier tube 47 from the voltage of condenser 34 or 34', this same voltage is utilized to control the output of a low frequency oscillator 72, having an output frequency similar to that connected at 48 of Fig. 2. Oscillator 72 is of the conventional type, but has its plate voltage, derived from source 56, controlled by a control tube 73 connected in series with the cathode-anode circuit of oscillator 72, between a source 56 of positive potential and a source 59 of negative potential. A portion of the voltage produced by condenser 34 or 34' is derived by means of a variable or adjustable voltage divider 74, and is applied to the control grid of control tube 73 through a series resistor 76. The condenser voltage thereby controls the conductivity of control tube 73, which in turn controls the plate potential applied to oscillator 72. Oscillator 72 is adapted to produce an output wave of a frequency similar to that impressed on terminals 48, the amplitude of this wave depending upon the plate voltage of the oscillator 72. This output is then supplied to the heater 33 for the tuning strut 32 of oscillator 16, similar to Fig. 2. In this manner an alternative form of control for the tuning strut 32 is provided. The tuning range is now adjusted by adjusting potentiometer tap 75.

Fig. 8 also shows another form of control for oscillator 16. As has been described in the above-mentioned Patent 2,250,511, the output frequency of a reflex velocity modulation oscillator of the present type may be adjusted within narrow limits by adjusting the electron transit time by varying the potential of the reflector electrode 28. In the present instance, a version of the voltage of condenser 34 or 34' is also applied to the reflector electrode 28. Thus voltage divider 74 may be provided with a second output tap 77. The changes in the voltage appearing between tap 77 and ground are led through a condenser 78, and superposed on a suitable negative or positive potential derived from a source 82 and voltage divider 83. The combined voltage thus obtained is applied to reflector 28 after a delay and smoothing action provided by resistor 79 and condenser 81. Adjustment of the voltage divider 83 will thereby adjust the center frequency of the range over which the reflector electrode can tune oscillator 16. The delay provided by circuit 79, 81 prevents the oscillator frequency from jumping so far off as to cause the discriminator to lose control, while preserving a fairly wide range of frequency control by the reflector electrode. The voltage derived from condenser 34—34' serves to modify this reflector electrode voltage in one sense or another to change the tuning accordingly.

While the complete tuning control of oscillator 16 could be effected by this type of electrical control of the reflector electrode 28, in which case oscillator 72 or power tube 47 would be eliminated, it is more desirable to utilize both the thermal tuning and the electrical tuning, since this produces a much-improved form of control. Thus, as stated above, the frequency control by the reflector electrode is effective only for a relatively narrow range of frequencies. The range of control by means of the tuning strut 32 extends over a much wider range. This thermal tuning control, however, is subject to the defect of its thermal inertia, which prevents the oscillator from responding rapidly to a change in the control voltage of condenser 34 or 34', such as is produced by a sudden change in intermediate frequency. By combining the thermal and electrical tuning controls, as in Fig. 8, any sudden change of condenser control voltage is effective to immediately change the oscillator frequency by changing the voltage of the reflector 28 before the change in strut tuning current can become effective to change the setting of the thermal strut. After a brief interval of time, during which the thermal strut expands to its new extension corresponding to the changed control voltage, the reflector voltage returns to the value determined by voltage divider 83. This will be seen more clearly from the consideration that condenser 78 permits only changes in the control voltage to pass therethrough.

Accordingly, by this circuit the change in condenser voltage is effective immediately to retune the oscillator, while the changed control voltage is effective to maintain the oscillator retuned to its new frequency. By proper adjustment of the variable tap 77 of voltage divider 74, and of the magnitudes of the circuit constants and voltages utilized, the quick correction provided by varying the reflector electrode voltage can be made to just compensate for the thermal inertia delay inherent in the tuning strut, so that, by the combined thermal and electrical tuning of this modification, the frequency of oscillator 16 can be maintained at the desired value substantially without lag, and can be made to respond quickly to changes in the intermediate frequency for a wide range of rates of change of this intermediate frequency.

If desired, the actual condenser voltage (or a portion thereof) may be applied directly to the reflector electrode. Before lock-in, this will merely extend the scanning range, because the variation in reflector voltage will change the frequency in the same sense as the variation in strut current. However, the reflector scanning should be small to permit proper oscillations over the entire thermal tuning range.

After lock-in, any drift will change the reflector voltage to change the frequency. This will change the strut current, which will tend to choose an average value at which the reflector voltage is correct.

Figure 9:
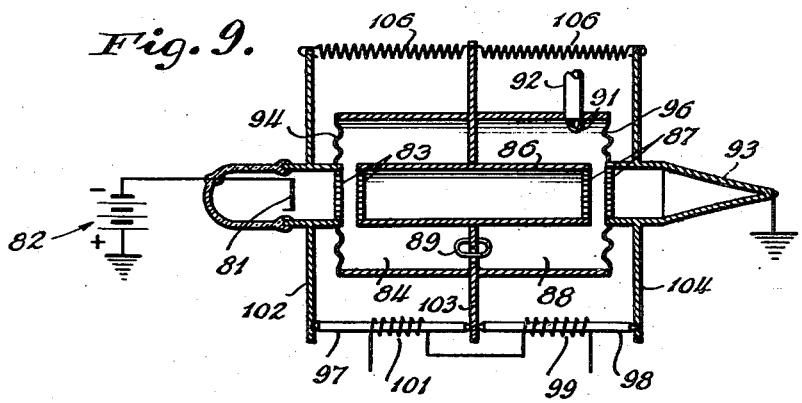
Fig. 9 shows a schematic diagram of an alternate form of oscillator which may be substituted for that shown in Figs. 2 or 8.

The invention has thus far been described solely with respect to a thermally tuned reflex velocity modulation oscillator. It is to be understood that many other types of oscillator may also be controlled from the voltage of condenser 34 or 34'. One such type is illustrated in Fig. 9, which shows a thermally tuned "Klystron" oscillator of the type disclosed in Varian Patent No. 2,242,275, issued May 20, 1941.

This tube has a cathode 81 which is generally maintained at a high negative potential with respect to ground by any suitable source of potential, schematically illustrated at 82. This source 82 causes a stream of electrons to be projected along the axis of the tube through a pair of grids 83 forming portions of the walls of a cavity resonator 84. As is well known, the ultra-high-frequency oscillating field between grids 83 velocity modulates the electrons of the beam, so that, during their subsequent travel through the field-free drift space formed by tubular member 86, the electrons become bunched or grouped. The grouped electrons then pass through a second pair of grids 87, forming portions of the walls of a second cavity resonator 88, to which they give up their ultra-high frequency electro-magnetic energy. The resonators 84 and 88 may be coupled by a suitable coupling link 89 to produce sustained oscillations, which may be abstracted from resonator 86 by any suitable terminal device, such as the loop 91 and output transmission line 92.

The electrons, after leaving the grids 87, are collected on the metallic walls of the evacuated housing, which may be conically shaped, as at 93, to provide a greater heat dissipating area. Each of the resonators 84 and 88 is provided with a flexible diaphragm 94 and 96, whereby the grids 83, 87 of the resonators may have their spacings adjusted to produce a corresponding adjustment of the resonant frequencies of the resonators, and of the output frequency of the oscillator.

Frequency adjustment is again provided by means of thermal tuning struts 97 and 98 having series-connected heater coils 99 and 101 for varying the separation between pairs of flanges 102, 103 and 103, 104, which are respectively rigidly connected to the corresponding pairs of grids 83 and 87. The grids 83 and 87 are normally urged together, either by the action of atmospheric pressure upon the evacuated housing, or by tension springs 106 tending to draw the flanges 102, 103 and 103, 104 together. Heating current passing through heater coils 101 and 99 serves to separate the grids 83 and 87 and thereby change the output frequency of the oscillator accordingly.

It will be clear that the oscillator of Fig. 9 may be utilized in place of that of Fig. 2 or of Fig. 8 merely by connecting the heater coils 99 and 101 in place of the heater coil 33 of the preceding figures.

Figure 10:
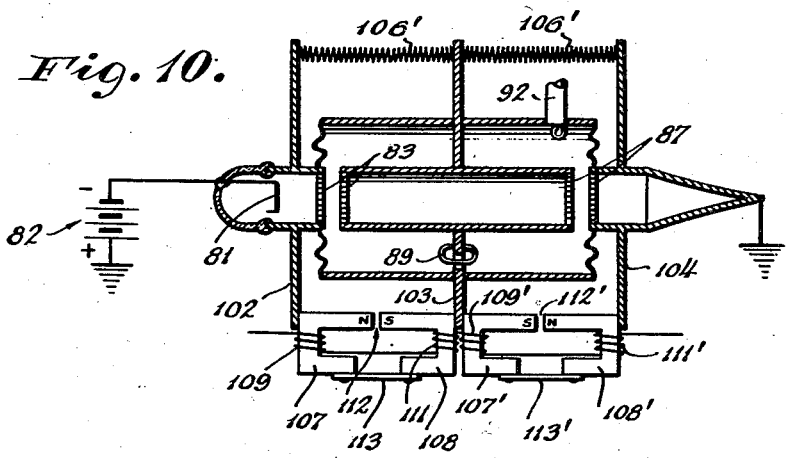
Fig. 10 shows a schematic diagram of still another form of oscillator useful in the circuits of Figs. 2 and 8, but using magnetic tuning.

Several other types of oscillators may also be utilized. Another such type is shown in Fig. 10, which is similar to Fig. 9 except that the heater coils 99 and 101 and the struts 97 and 98 have been replaced by magnetically actuated-force transmitting means. Thus, fixed to flanges 102 and 103 is a pair of soft iron cores or pole pieces 107 and 108 having series-connected energizing coils 109, 111, which are so connected as to produce opposite magnetic poles at the narrow gap 112 between the pole pieces 108, 109. Pole pieces 107, 108 are also connected by a flat spring 113, preferably also of magnetic material, which thereby serves to complete the magnetic circuit.

Accordingly, the passage of current through grids 109 and 111 will produce a force between the pole pieces corresponding to this wall. Since the pole pieces are rigidly fastened to the flanges 102, 103, a corresponding force is exerted upon the grids 83. This force is opposed by compression spring 106' and by spring 113 so that the displacement of grids 83 from their normal positions will be substantially proportional to the current flowing through grids 109 and 111. A similar arrangement is provided for adjusting grids 87, the elements being designated by the same reference numerals, but primed.

Preferably, the device of Fig. 10 operates on direct current, and, accordingly, the voltage across condenser 34 or 34' may be applied directly to the magnetic energizing coils 109, 111, 109', 111'. If necessary, a direct current amplifier may be interposed to produce a stronger energizing current. However, the apparatus of Fig. 10 may also be utilized on alternating current, but in this case, some smoothing action may be desirable which may be provided by suitable dashpots interposed between the flanges 102, 103 and 103, 104. If desired, the device of Fig. 10 could be substituted directly for the oscillator 16 of Fig. 2 or Fig. 8 by merely rectifying the current formerly supplied to heater 33 and substituting coils 109, 111 for the heater 33.

It will be noted that, for increasing tuning control current, the device of Fig. 10 will produce increasing output frequencies, which is opposite to the effect produced in Figs. 2, 8 or 9. For this reason, when using the device of Fig. 10 the discriminator output terminals should be interchanged, in order to produce stable operation.

Although the above invention has been described with respect to a radio pulse object detecting system, it is not necessarily restricted to such use. For example, the system may equally well be utilized to cause the oscillator 16 to remain in step or to correspond in frequency, with any frequency source.

Figure 11:
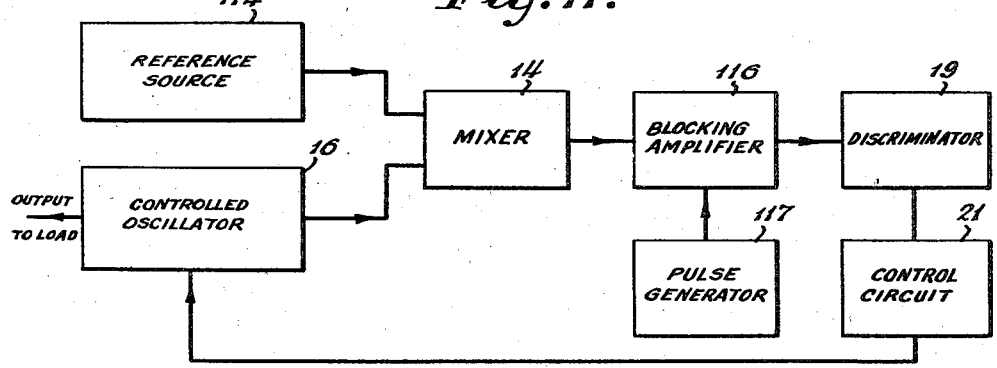
Fig. 11 shows another type of system in which the present invention may be used.

For example, in Fig. 11 the oscillator 16 may be kept in fixed-frequency-difference relation to a continuous wave source of reference frequency 114, which may be either a standard oscillator, a received wave, or any other source of ultra-high frequency to which it is desired to synchronize oscillator 16. The outputs of oscillator 16 and the reference frequency source 114 are applied to mixer 14, whose output will now be a continuous wave rather than a pulsed wave as in Fig. 1.

This continuous intermediate frequency wave is applied to the input of a blocking amplifier 116, whose conductivity is controlled from a suitable pulse generator 117, which is adapted to produce a periodic sequence of pulses having a repetition frequency, for example, similar to that of pulse transmitter 11. The transmission through amplifier 116 is adapted to thereby be intermittently interrupted by the pulse wave derived from pulse generator 117, so that the output derived from blocking amplifier 116 will be of the same character as the input to the frequency discriminator 19 in Fig. 1.

Accordingly, this pulsed intermediate frequency wave may be fed to the discriminator 19 to actuate control circuit 21 for controlling oscillator 16 in exactly the same manner as in the preceding figures. In this way, the system already described may also be utilized to maintain oscillator 16 in synchronism with any suitable continuous wave source of oscillations. It will be obvious that the present invention may also be utilized in many other instances.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Frequency control apparatus for an ultra-high-frequency cavity resonator device having thermally extensible tuning means for varying the operating frequency thereof comprising a source of electrical energy connected to said tuning means for providing thermal actuation thereof, means for producing a periodically varying control voltage, means for controlling said source by said voltage to correspondingly periodically vary the operating frequency of said device, and means responsive to a predetermined relation between said operating frequency and a desired frequency condition of said device for modifying said control voltage to interrupt said periodic frequency variation.

2. Frequency control apparatus for an ultra high frequency velocity modulation cavity resonator device having thermally extensible tuning means for varying the operating frequency thereof and heater means for actuating said tuning means, comprising a source of electrical energy connected to said heater means, means for producing a periodically varying control voltage, means for controlling said source by said control voltage to correspondingly periodically vary the operating frequency of said device, and means responsive to a predetermined relation between said operating frequency and a desired frequency condition of said device for modifying said control voltage to interrupt said periodic frequency variation.

3. Apparatus as in claim 1 further comprising means responsive to said modified control voltage for maintaining said operating frequency in a desired condition.

4. Frequency control apparatus for a reflex velocity modulation oscillator having thermally-actuated tuning means for varying the operating frequency thereof and a tuning control heater coil for heating said tuning means, comprising a source of energy for said heater coil, and a saw-tooth oscillation generator for controlling the energy output of said source, said generator including a condenser and means for periodically charging and discharging said condenser to produce said saw-tooth oscillations, whereby the operating frequency of said oscillator is periodically scanned over a pre-determined frequency range corresponding to said saw-tooth oscillations.

5. Apparatus as in claim 3, further comprising means for interrupting said periodic scanning and for maintaining the operating frequency of said oscillator at a predetermined value, said last-named means comprising means responsive to a predetermined relation between said operating frequency and said desired frequency for interrupting the discharging of said condenser, whereby the energization of said heater by said source is maintained substantially constant and said operating frequency is correspondingly maintained at the desired value.

6. Automatic frequency control apparatus for a superheterodyne receiver for received pulsed high frequency waves and having a local oscillator and thermally-actuated tuning means for said oscillator, and also having heater means for actuating said tuning means, comprising frequency discriminator means for producing a pulsed control signal representing deviation of said local oscillator frequency from a desired relation with respect to said received wave, a source of heating energy, sawtooth voltage generator means for producing a sawtooth voltage wave, means for periodically varying the application of heating energy from said source to said heater means under the control of said sawtooth voltage wave, whereby said local oscillator voltage is periodically scanned in frequency in correspondence with the variation in said sawtooth voltage, and means responsive to said pulsed control wave for interrupting the variation of said sawtooth wave upon the attainment of a local oscillator frequency having said desired relation with respect to said received wave.

7. Apparatus as in claim 6, wherein said sawtooth voltage generator means comprises a condenser, means for slowly charging said condenser, and means for rapidly discharging said condenser, and wherein said interrupting means comprises means responsive to the pulses of said pulsed control voltage for substantially preventing discharge of said condenser.

8. Apparatus as in claim 6, wherein said local oscillator comprises a cavity resonator, means for projecting an electron stream through said resonator, and means including a reflector electrode for causing said electrons to reenter said resonator, and said apparatus further including means for controlling the potential of said reflector electrode by said sawtooth voltage wave simultaneously with the control of heating energy to said heating means by said sawtooth voltage wave.

9. Frequency control apparatus for a reflex velocity modulation oscillator having a tunable cavity resonator and a reflector electrode, comprising means for producing a periodically varying control voltage and means including a delay circuit for controlling the tuning of said resonator in accordance with said control voltage and for controlling the potential of said reflector electrode in accordance with a delayed version of said control voltage, whereby to periodically vary the output frequency of said oscillator over a predetermined frequency band.

10. Frequency control apparatus for a reflex velocity modulation oscillator having a tunable cavity resonator and a reflector electrode, comprising means for producing a control voltage for controlling the output frequency of said device, means for tuning said resonator by said control voltage, means including a delay circuit for deriving a time-delayed version of said control voltage, and means for controlling the potential of said reflector electrode in accordance with said time-delayed version of said control voltage.

11. High frequency apparatus comprising a cavity resonator having a pair of electron-permeable walls defining a gap therebetween, means for projecting an electron beam through said gap, means including a reflector electrode for re-directing said beam through said gap, whereby oscillations may be sustained within said resonator, means for producing a control voltage corresponding to a desired frequency condition of said oscillations, means for tuning said resonator under the control of said control voltage, means for deriving a time-delayed version of said control voltage, and means for applying a potential to said reflector electrode corresponding to said time-delayed control voltage.

12. The method of operating a reflux oscillator having a tunable cavity resonator and a reflector electrode, comprising producing a control voltage corresponding to a desired frequency condition of said oscillator, tuning said resonator in correspondence with said control voltage, and controlling the potential of said reflector electrode in correspondence with the rate of change of said control voltage.

13. The method of operating an electron discharge device having a pair of electron-permeable electrodes connected to a tuned circuit, comprising the steps of projecting an electron stream through said electrodes, producing a control signal representing a desired frequency condition of said device, varying the resonant frequency of said tuned circuit in accordance with said signal, and varying the transit time of electrons through said device in accordance with the rate of change of said signal.

14. High frequency apparatus comprising a pair of electron-permeable electrodes defining a gap therebetween, a tuned circuit connected to said electrodes, means for projecting a stream of electrons through said gap, means including a reflector electrode for re-directing said electrons back through said gap, whereby oscillations may be sustained in said circuit, means for producing a control signal corresponding to a desired frequency of said oscillations, means for controlling the resonant frequency of said tuned circuit in accordance with said signal, and means for applying a potential to said reflector electrode corresponding to the rate of change of said signal.

15. Control apparatus for a high frequency apparatus having separate rapid-acting and slow-acting tuning means, comprising means for producing a control signal corresponding to a desired frequency condition of said apparatus, means for controlling said slow-acting tuning means in correspondence with said signal, and means for controlling said rapid-acting tuning means in response to the rate of change of said signal.

16. High frequency apparatus comprising a cavity resonator having electron-permeable walls defining a gap therebetween, means for projecting an electron stream through said gap, means including a reflector electrode for re-directing said stream back through said gap, whereby oscillations are produced within said resonator, means including a thermally-extensible member and heating means for said member for controlling the tuning of said resonator, means for producing a control signal corresponding to deviation of the frequency of said oscillations from a desired value, means for applying a control potential to said reflector electrode derived from said signal, and further means for energizing said heating means in accordance with said signal.

17. Frequency control apparatus for a reflex velocity-modulation oscillator having a cavity resonator and thermally-actuated means for tuning said resonator and also having a reflector electrode, comprising means for producing a periodically varying control voltage, means for controlling the potential of said reflector electrode by said control voltage, and means for heating said thermally-actuated tuning means in correspondence with said varying control voltage, whereby the output frequency of said oscillator is periodically varied over a predetermined frequency band.

18. The method of controlling a reflex velocity-modulation electron discharge device having a reflector electrode and a cavity resonator with thermally-actuated tuning means, comprising the steps of producing a control voltage for controlling the output of said device, supplying heating energy to said thermally-actuated tuning means in response to said control voltage, and simultaneously controlling the potential of said reflector electrode in response to said control voltage.

19. Frequency control apparatus for a high frequency device having thermally-actuated tuning control means and heater means for actuating said tuning control means, comprising in combination a source of oscillations having a frequency high in comparison to the thermal lag of said tuning means, means for applying said oscillations to said heater means to control said tuning means, means for producing a control voltage having an amplitude characteristic dependent upon the desired operating frequency of said device, and means for controlling said applying means by said control voltage to thereby control said operating frequency.

20. Frequency control apparatus for a high-frequency device having thermally actuated tuning means, comprising in combination a source of oscillations connected to energize said tuning means and having a frequency high in comparison to the thermal lag of said tuning means, and means responsive to deviations of the operating frequency of said device from a desired value for controllably adjusting the output of said source to alter the operating frequency of said device to reduce the magnitude of said deviations.

21. Frequency control apparatus for a high frequency device having thermally-actuated tuning means and heater means for actuating said tuning means, comprising in combination a source of oscillations connected to energize said heater means and having a frequency high in comparison to the thermal lag of said tuning means, and means responsive to deviations of the operating frequency of said device from a desired value for controllably adjusting the output of said source so as to alter the operating frequency of said device to reduce the magnitude of said deviations.

22. Control apparatus for a cavity resonator electron discharge device having a cavity resonator with thermally-actuated tuning means therefor and electric heating means for energizing said tuning means to vary the resonant frequency of said resonator, comprising means for producing a control voltage corresponding to a desired condition of said device, means comprising a source of square wave voltage for energizing said heating means, and means for controlling said energizing means in response to said control voltage, whereby said device may be maintained at said desired condition.

23. Frequency control apparatus for a high frequency electron discharge device having thermally-actuated tuning means and heater means for actuating said tuning means, comprising, in combination, a source of square wave oscillations connected to energize said heater means, and means responsive to deviations of the operating frequency of said device from a desired value for adjusting the output of said source to thereby alter the operating frequency of said device so as to reduce said deviations.

24. Frequency control apparatus for a thermally tuned high frequency device having thermally-actuated tuning means and heater means for actuating said tuning means, comprising, in combination, a source of oscillations connected to energize said heating means, and means responsive to deviations of the operating frequency of said device from a desired value for controllably adjusting the output of said source so as to alter the operating frequency of said device to reduce the magnitude of said deviations.

25. Frequency control apparatus for a thermally-tuned device having thermally-actuated tuning means and heater means for actuating said tuning means, comprising an oscillator coupled to supply power to said heater means and having a source of exciting potential, a control tube in series with said source, means for producing a control voltage corresponding to a desired frequency condition of said device, and means for controlling the conductivity of said control tube in response to said voltage, whereby the output of said oscillator is controlled to adjust the energization of said heater means and thereby the frequency of said device.

HORACE MYRL STEARNS.

REFERENCES CITED

The following references are of record in the file of this patent:

UNITED STATES PATENTS

| Number | Name | Date |
|---|---|---|
| 2,012,603 | Fuchs | Aug. 27, 1935 |
| 2,098,331 | Bowman | Nov. 9, 1937 |
| 2,326,737 | Andrews | Aug. 17, 1943 |
| 2,242,249 | Varian | May 20, 1941 |
| 2,242,275 | Varian | May 20, 1941 |
| 2,245,627 | Varian | June 17, 1941 |
| 2,162,335 | Jacob | June 13, 1939 |
| 2,203,750 | Sherman | June 11, 1940 |
| 2,262,147 | Owsley | Nov. 11, 1941 |
| 1,847,160 | Affel | Mar. 1, 1932 |
| 2,294,942 | Varian | Sept. 8, 1942 |
| 2,287,925 | White | June 30, 1942 |
| 2,284,266 | Bellescize | May 26, 1942 |
| 2,254,601 | Feld | Sept. 2, 1941 |
| 2,374,810 | Fremlin | May 1, 1945 |

FOREIGN PATENTS

| Number | Country | Date |
|---|---|---|
| 537,518 | Great Britain | June 25, 1941 |

Certificate of Correction

Patent No. 2,434,293.                                    January 13, 1948.

HORACE MYRL STEARNS

It is hereby certified that errors appear in the above numbered patent requiring correction as follows: In the grant, lines 6 and 7, in the heading to the drawing, line 2, and in the heading to the printed specification, lines 2 and 3, title of invention, for "Frequency Control of an Oscillator of the Velocity Modulation Type" read *Oscillator Frequency Control System*; column 8, lines 67 and 68, strike out the word "positive"; and that the said patent should be read with these corrections therein that the same may conform to the record of the case in the Patent Office.

Signed and sealed this 4th day of May, A. D. 1948.

[SEAL]

THOMAS F. MURPHY,
*Assistant Commissioner of Patents.*